Figure 1:
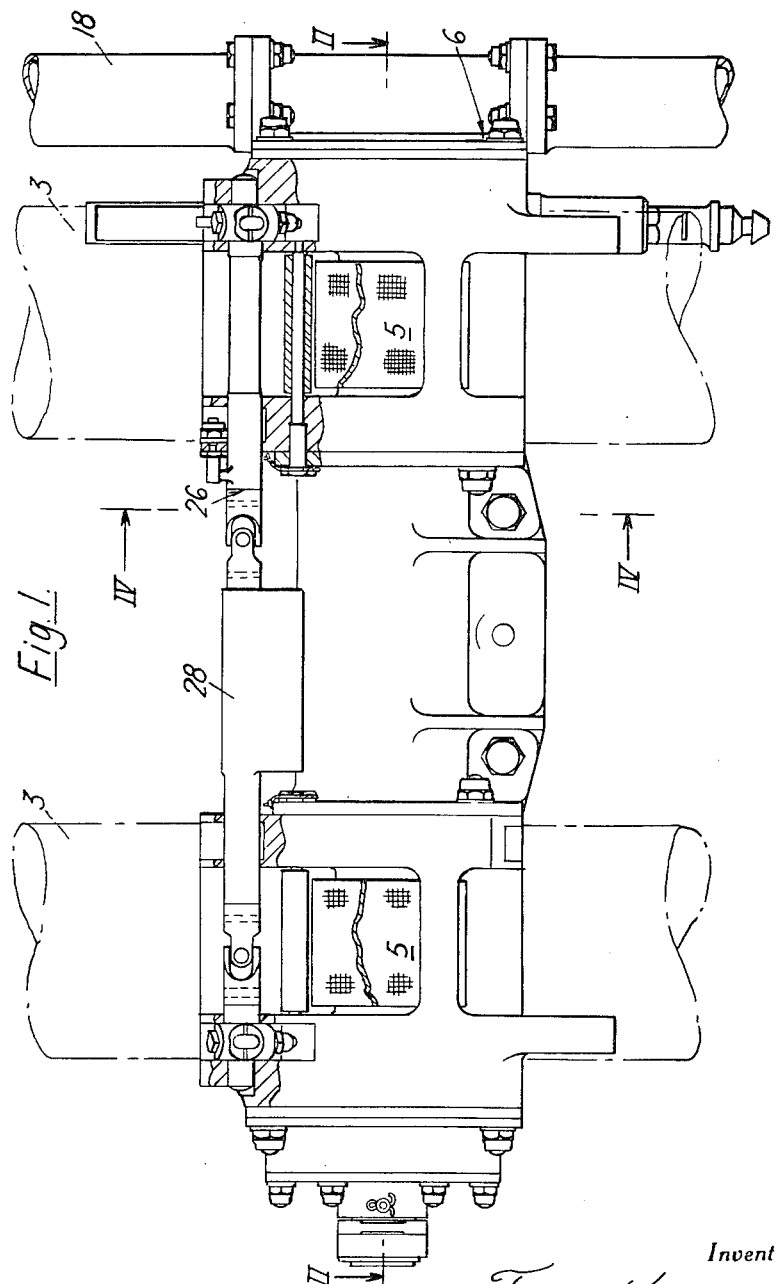

Nov. 2, 1965  J. MARTIN  3,215,376
AIRCRAFT EJECTION SEATS
Filed Feb. 13, 1964  5 Sheets-Sheet 1

Inventor
JAMES MARTIN
By

Nov. 2, 1965  J. MARTIN  3,215,376
AIRCRAFT EJECTION SEATS
Filed Feb. 13, 1964  5 Sheets-Sheet 5

Inventor
JAMES MARTIN
By

United States Patent Office 3,215,376
Patented Nov. 2, 1965

3,215,376
AIRCRAFT EJECTION SEATS
James Martin, Southland Manor, Southland Road,
Denham, near Uxbridge, England
Filed Feb. 13, 1964, Ser. No. 344,613
Claims priority, application Great Britain, Feb. 27, 1963,
7,933/63
2 Claims. (Cl. 244—122)

This invention concerns aircraft ejection seats and is especially concerned with the hardness arrangements for the occupant of such a seat.

It is known to provide an aircraft ejection seat with shoulder harness arrangements including a "forward reach" mechanism which, when operated, frees the shoulder harness to permit the seat occupant to lean forwardly. Such a mechanism is, for instance disclosed in the specification of Patent No. 3,036,796.

Safe ejection from an aircraft is achieved only when the ejection seat occupant is correctly positioned in the seat. An occupant of a seat fitted with "forward reach" mechanism must, therefore, be sure to adopt the correct position in the seat prior to initiation of ejection, if such mechanism has been operated to free the shoulder harness.

In single seat aircraft it is, of course, the seat occupant that initiates ejection and can, therefore, adopt the proper position in the seat before initiating ejection. In the case, however, of aircraft equipped with two or more ejection seats experience has shown that it is desirable that ejection of each seat should be initiated at the same time, for instance by the aircraft captain. In high speed aircraft in particular, an emergency may give rise to a situation in which ejection must be initiated immediately without time being available for communication amongst the aircrew concerned, and it will be understood that in such circumstances ejection could be initiated whilst a particular seat occupant was not correctly positioned in his seat.

Thus, one object of this invention is to provide mechanism whereby the initiation of ejection of an aircraft ejection seat will result in the seat occupant being automatically correctly positioned in the seat.

According to this invention there is provided retraction mechanism for positioning the occupant of an aircraft ejection seat correctly and safely for ejection from the aircraft, said mechanism comprising at least one reel carrying a strap adapted to be secured to the airman or to his harness, each said reel being adapted to be rotated to tension the strap therearound upon initiation of ejection.

Conveniently said reel is rotatable by means of a rack and pinion assembly associated therewith, the rack of such assembly being adapted to be moved, in the sense to effect tensioning of said strap, by fluid pressure, e.g., by means of a gas generated by the firing of an explosive cartridge upon initiation of ejection.

Figure 2:
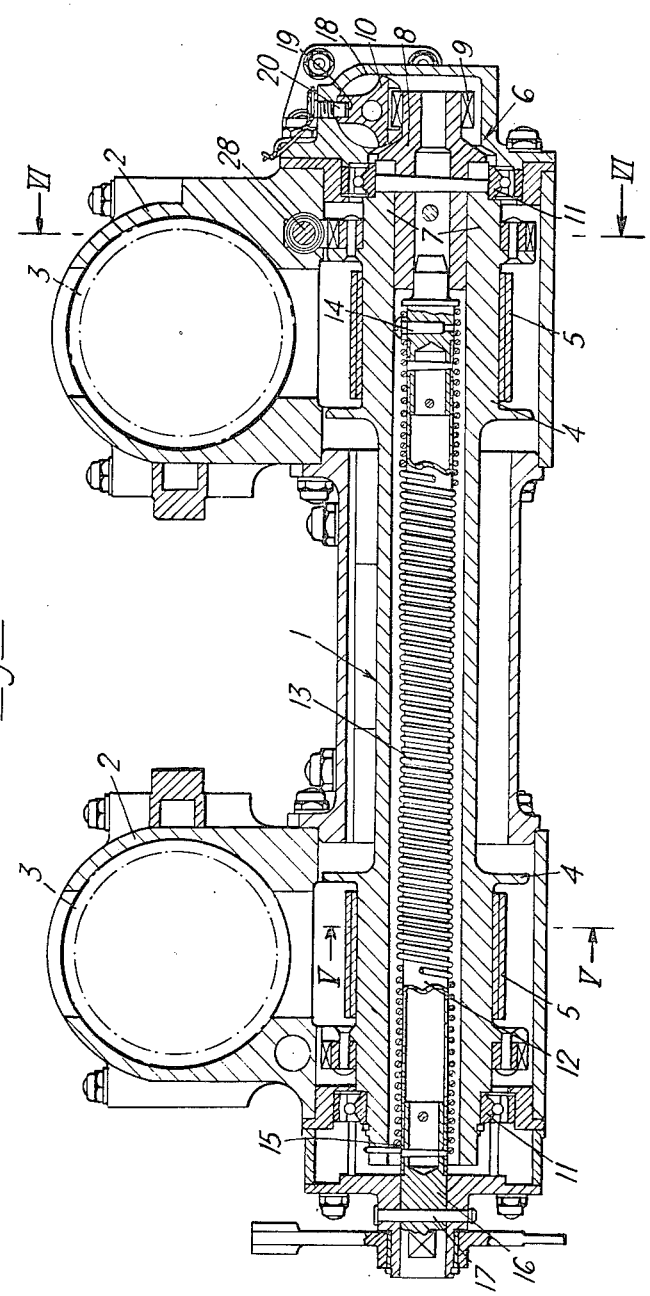
Figure 3:
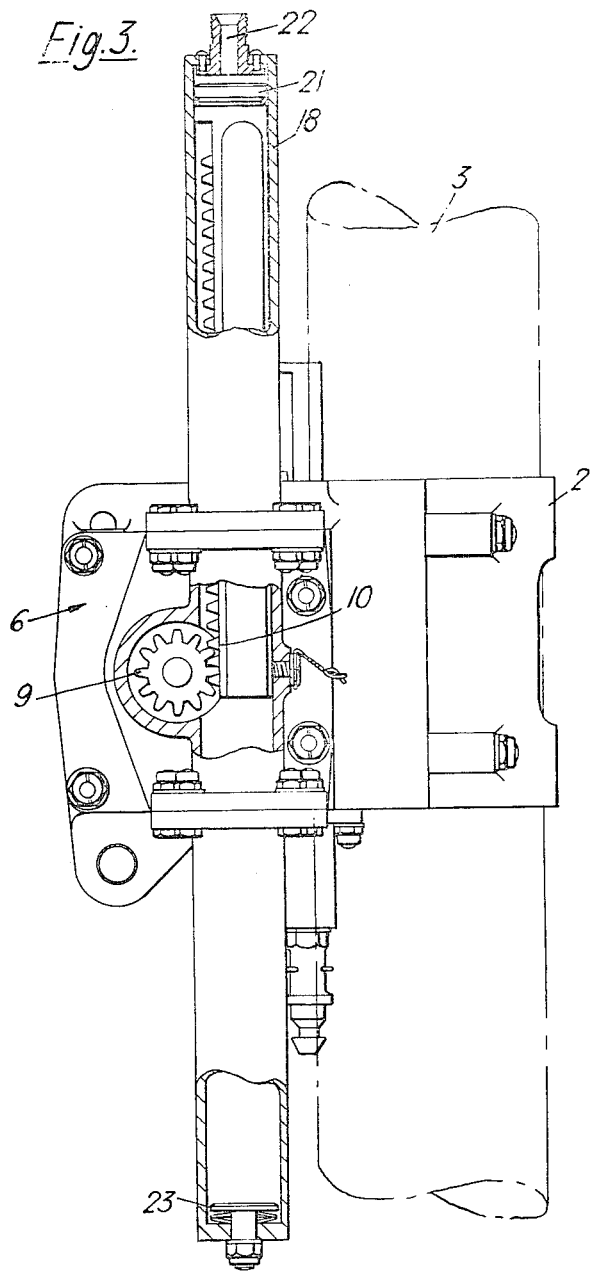
Figure 4:
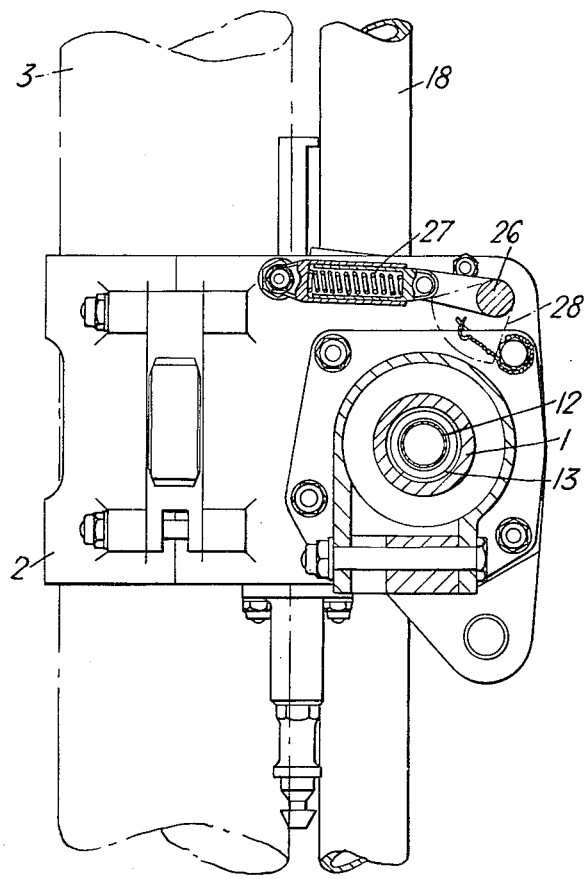
Figure 5:
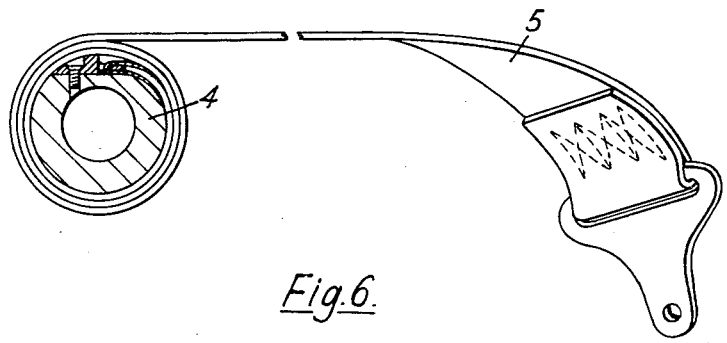
Figure 6:
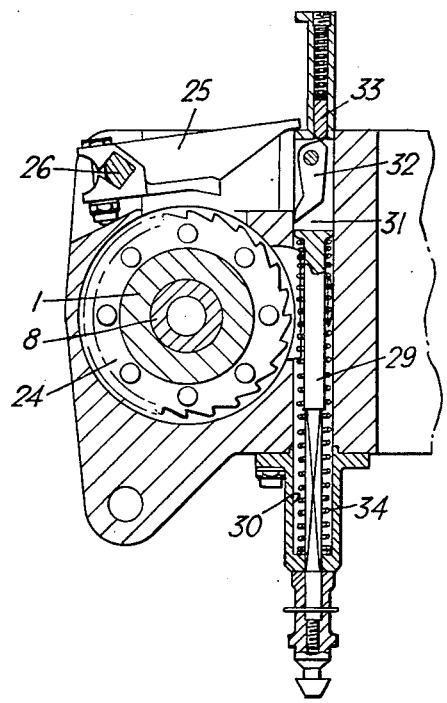

In order that the invention may be more readily understood, one embodiment of mechanism according to this invention will now be described by way of example and with reference to the accompanying drawings in which:

FIGURE 1 is a front view of such mechanism;
FIGURE 2 is a horizontal medial sectional view on the line II—II of FIGURE 1;
FIGURE 3 is an end view of the mechanism shown in FIGURE 1;
FIGURE 4 is a sectional view of the mechanism taken on the line IV—IV of FIGURE 1;
FIGURE 5 is a fragmentary sectional view taken on the line V—V of FIGURE 2; and
FIGURE 6 is a sectional view taken on the line VI—VI of FIGURE 2.

In this embodiment the mechanism comprises a hollow shaft 1 mounted for rotation on an ejection seat by means of clamps 2 placed around tubular members 3 on the seat, not otherwise shown, such shaft 1 being formed integrally with a pair of reels 4 each having wound therearound a strap 5 passing forwardly from the reel 4 to constitute a shoulder harness strap for the occupant of the ejection seat. The hollow shaft 1 is arranged to extend at one end into a housing 6, the part 7 of the shaft within this housing carrying a co-axial part 8 having a pinion 9 fixed thereto. This pinion 9 cooperates with a rack 10 the arrangement of which will be described more fully hereinafter.

The hollow shaft 1 is supported for rotation by a pair of roller bearings 11 and rotatably houses, within its bore, a central spindle 12 having a torsion spring 13 arranged therearound, the spring 13 being anchored at one end at 14 to the spindle 12 and at its other end at 15 to the shaft 1 thereby to tend to rotate the hollow shaft 1 in the sense required to wind the straps 5 on to the reels 4 of the shaft 1. One end 16 of the spindle 12 is anchored by means of a pin 17 against rotation.

The said rack 10 is arranged for reciprocation in a cylinder 18 carried by said housing 6, the rack 10 having a longitudinal groove 19 mating with a guide peg 20 in the cylinder 18 to prevent rotation of the rack 10 about its axis. The rack 10 meshes with the pinion 9 and one end 21 of the rack 10 is formed as a piston so that admission of pressure fluid through the bore 22 to the cylinder 18 drives the rack 10 to the other end of the cylinder 18 thereby to rotate the pinion 9 and hollow shaft 1 in the sense to tension the straps 5 on the reels 4. A spring cushioning device 23 is provided at the end of the cylinder 18 remote from the bore 22.

The pressure fluid used may be gases generated by the firing of a suitable cartridge in a breech carried by or connected to said bore 22 in the end of the cylinder 18, the arrangement in any event being such that pressure fluid will be fed to the cylinder 18, e.g., by firing said cartridge, upon initiation of the seat ejection sequence.

The mechanism as thus far described provides a pair of shoulder harness straps 5 normally subject to spring tensioning by the said torsion spring 13 and which will be reeled in, by the admission of pressure fluid to said cylinder 18, positively to draw the seat occupant into proper position in the seat upon initiation of ejection.

The mechanism further includes a forward reach facility provided by a ratchet device in the form of a ratchet wheel 24 on said hollow shaft 1 and a pawl 25 on a shaft 26, the shaft 26 normally being rotatively positioned to hold the pawl 25 out of engagement to enable the straps to be payed out in response to forward movement of the occupant in the seat. The pawl 25 may be engaged with the ratchet wheel 24 to prevent paying out of the straps 5 without, however, hindering reeling in of the straps 5 under the influence of the torsion spring 13 or of the rack 10.

The pawl 25 is moved by rotating the shaft 26, such shaft carrying a radius arm (not shown) connected to a cable leading to an operating lever positioned on said seat so that the seat occupant may, by manual operation of said lever, engage or disengage said pawl 25 from the ratchet wheel 24.

In this embodiment the ratchet device includes an "inertia lock" comprising an acceleration—sensitive overcentre spring toggle 27 and a pendulous weight 28 acting on the shaft 26 to effect ratchet engagement in response to predetermined inertia loads, e.g., loads due to acceleration of the seat during ejection thereof.

The mechanism may, if desired, embody the strap-tightening arrangement the subject of my co-pending, simultaneously filed application, Serial Number 344,611, to enable the seat occupant, upon voluntary engagement of the ratchet device, to effect tightening of the straps to a desired extent by incremental rotation of the hollow shaft in the strap-tightening direction. Such strap tightening arrangement is illustrated in FIGURE 6 of the accompanying drawings and comprises a piston member 29 arranged for reciprocation in guide 30 adjacent the periphery of the ratchet wheel 24, this piston member 29 having a slot 31 housing a pawl 32 engaged by a spring loaded plunger 33 which biasses the pawl 32 towards engagement with the teeth of the ratchet wheel 24.

A spring 34, acting between said piston member 29 and the guide 30, urges the piston member 29 in a direction corresponding to rotation of the ratchet wheel sense for paying out the harness shoulder straps 5 from their respective reels 4, and towards a position in which the pawl 32 is clear of the ratchet wheel teeth.

The piston member 29 is coupled to a flexible cable (not shown) whereby manual operation of such control device, by the seat occupant, may move the piston member 29 in a direction opposed to the spring 34 whereby the pawl 32 carried by the piston member 29 will engage the teeth of the ratchet wheel 24 and rotate the same in the sense corresponding with winding in of the harness shoulder straps. From this description it will be appreciated that reciprocation of the member 29 will cause incremental rotation of the wheel 24 and the harness shoulder straps tightened to the desired degree.

Whilst the mechanism described, with reference to the drawings may be applied to an ejection seat for a single-seat aircraft to provide "forward reach" facilities coupled with positive tightening of the harness shoulder straps, and thereby correct positioning of the seat occupant for ejection, upon initiation of ejection, the mechanism is particularly suited to application to each of the ejection seats of a plural-seat aircraft, since in such cases the initiation of ejection of all the seats may be controlled by the occupant of one seat. Under such circumstances arrangements are made for supplying pressure fluid simultaneously or in an appropriate sequence to the cylinders of the mechanisms on all seats to achieve shoulder harness tightening, as described, when the ejection sequence is initiated.

If desired the pinion 9 on the shaft 1 that meshes with the rack 10 may have meshed therewith a second pinion (not shown) on a reel for a restraining strap system that is adapted to be connected to the seat occupant's head gear and so arranged that operation of the rack to reel-in the harness straps also reels-in the head restraining strap system whereby to draw the seat occupant's head into proper position relatively to the seat head rest for ejection.

I claim:
1. For an aircraft ejection seat, retraction mechanism for positioning the seat occupant for seat ejection, comprising:
  (a) a hollow shaft adapted for rotatable mounting on the seat;
  (b) a spindle within said shaft adapted for fixed mounting on the seat;
  (c) a pair of reels spacedly secured to said shaft;
  (d) a strap on each reel for attachment to the seat occupant;
  (e) a torsion spring encircling said spindle within said shaft and secured to said spindle and to said shaft for rotatively biasing said shaft in the sense required to wind said straps on to said reels;
  (f) a pinion secured to said shaft;
  (g) a rack engaging said pinion to rotate the pinion, said shaft, and said reels upon movement of said rack;
  (h) a cylinder adapted for mounting on the seat, said cylinder having an axis;
  (i) a source of pressure fluid communicating with said cylinder; and
  (j) a piston slidably received in said cylinder in sealing engagement therewith for axial movement under the pressure of said fluid,
    (1) said rack being fixedly fastened to said piston for axial movement therewith in engagement with said pinion.

2. For an aircraft ejection seat, retraction mechanism for positioning the seat occupant for seat ejection, comprising:
  (a) a shaft adapted for rotatable mounting on the seat;
  (b) a pair of reels spacedly secured to said shaft;
  (c) a strap on each reel for attachment to the seat occupant;
  (d) a spring rotatively biasing said shaft in the sense required to wind said straps on to said reels;
  (e) a pinion secured to said shaft;
  (f) a rack engaging said pinion to rotate the pinion, said shaft, and said reels upon movement of said rack;
  (g) a cylinder adapted for mounting on the seat, said cylinder having an axis;
  (h) a source of pressure fluid communicating with said cylinder;
  (i) a piston slidably received in said cylinder in sealing engagement therewith for axial movement under the pressure of said fluid,
    (1) said rack being fixedly fastened to said piston for axial movement therewith in engagement with said pinion;
  (j) a ratchet wheel secured to said shaft;
  (k) a pawl for engaging said ratchet wheel to prevent rotation of the shaft in the sense for paying out said straps;
  (l) an inertia lock adapted to move said pawl into engagement with said ratchet wheel in response to a predetermined acceleration of the mechanism; and
  (m) a manual strap tensioning device for rotating said reel in the sense to wind said strap thereon.

References Cited by the Examiner
UNITED STATES PATENTS

| | | | |
|---|---|---|---|
| 2,527,020 | 10/50 | Martin | 244—122 |
| 2,547,777 | 4/51 | Ray | 242—107.4 |
| 2,567,638 | 10/51 | Martin | 244—122 |
| 2,612,326 | 9/52 | Schweisthal | 242—86 |
| 3,064,920 | 11/62 | Cushman et al. | 242—107.4 |
| 3,077,324 | 2/63 | Strickland | 244—122 |
| 3,105,662 | 10/63 | Wrighton | 244—122 |

MILTON BUCHLER, *Primary Examiner.*
FERGUS S. MIDDLETON, *Examiner.*